United States Patent
Tada et al.

(10) Patent No.: US 7,455,772 B2
(45) Date of Patent: *Nov. 25, 2008

(54) HOLLOW-FIBER POROUS WATER FILTRATION MEMBRANE OF VINYLIDENE FLUORIDE RESIN AND PROCESS FOR PRODUCING THE SAME

(75) Inventors: Yasuhiro Tada, Ibaraki-Ken (JP); Takeo Takahashi, Ibaraki-Ken (JP); Masayuki Hino, Ibaraki-Ken (JP); Shingo Taniguchi, Fukushima-Ken (JP); Kenichi Suzuki, Ibaraki-Ken (JP); Toshiya Mizuno, Ibaraki-Ken (JP)

(73) Assignee: Kureha Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/629,350

(22) PCT Filed: Jun. 8, 2005

(86) PCT No.: PCT/JP2005/010479

§ 371 (c)(1),
(2), (4) Date: Dec. 12, 2006

(87) PCT Pub. No.: WO2005/123234

PCT Pub. Date: Dec. 29, 2005

(65) Prior Publication Data

US 2007/0215540 A1    Sep. 20, 2007

(30) Foreign Application Priority Data

Jun. 15, 2004    (JP) ............................ 2004-177285

(51) Int. Cl.
| | |
|---|---|
| *B01D 39/00* | (2006.01) |
| *B01D 30/14* | (2006.01) |
| *B23C 65/00* | (2006.01) |
| *B32B 1/00* | (2006.01) |

(52) U.S. Cl. ........................... 210/500.36; 210/500.27; 210/500.42; 210/500.23; 428/315.5; 264/41; 264/177.14; 264/177.13

(58) Field of Classification Search ............ 210/500.27, 210/500.36, 500.42, 500.23; 428/315.5; 361/402; 264/41, 177.14, 211.12, 211.13, 264/211.14, 197
See application file for complete search history.

(56) References Cited

U.S. PATENT DOCUMENTS

| | | | |
|---|---|---|---|
| 5,283,302 A | 2/1994 | Wakamori et al. | |
| 5,344,904 A | 9/1994 | Wakamori et al. | |
| 5,514,461 A | 5/1996 | Meguro et al. | |
| 5,626,805 A | 5/1997 | Meguro et al. | |
| 5,698,101 A * | 12/1997 | Kopp et al. | 210/500.23 |
| 6,074,718 A * | 6/2000 | Puglia et al. | 428/36.5 |
| 6,299,773 B1 * | 10/2001 | Takamura et al. | 210/500.23 |
| 6,327,136 B1 * | 12/2001 | Meguro et al. | 361/502 |
| 6,677,416 B2 * | 1/2004 | Sato et al. | 526/255 |
| 7,182,870 B2 * | 2/2007 | Minegishi et al. | 210/500.23 |
| 2003/0094409 A1 | 5/2003 | Minegishi et al. | |

FOREIGN PATENT DOCUMENTS

| | | |
|---|---|---|
| EP | 1 230 970 A1 | 8/2002 |
| JP | 05-239150 | 9/1993 |
| JP | 07-173323 | 7/1995 |
| JP | 10-265635 | 10/1998 |
| JP | 11-152366 | 6/1999 |
| JP | 2000-218267 | 8/2000 |
| WO | 03-031038 | 4/2003 |

* cited by examiner

*Primary Examiner*—Ana M Fortuna
(74) *Attorney, Agent, or Firm*—Wenderoth, Lind & Ponack, L.L.P.

(57) ABSTRACT

A vinylidene fluoride resin having a weight-average molecular weight as relatively high as 300,000 or higher is mixed with a plasticizer and good solvent for the vinylidene fluoride resin to obtain a composition. A molten extrudate of the composition in a hollow-fiber membrane state is contacted, on its outer side, with a cooling liquid inert to the vinylidene fluoride resin to thereby cool the extrudate. During the solidification, the vinylidene fluoride resin is moderately and mildly crystallized. Thus, a hollow-fiber porous vinylidene fluoride resin membrane is produced which has a high crystallinity represented by an enthalpy of crystal melting 58 J/g or higher. The hollow-fiber porous membrane obtained is excellent in mechanical strength represented by tensile strength and elongation at break and in chemical resistance. It is effectively used as a water microfiltration membrane.

11 Claims, No Drawings and a higher maximum peak temperature leads to a better ozone resistance. The document also describes that a porous membrane comprising a PVDF resin having a weight-average molecular weight of less than $10^5$ exhibits an extremely low tensile elongation at break.

HOLLOW-FIBER POROUS WATER FILTRATION MEMBRANE OF VINYLIDENE FLUORIDE RESIN AND PROCESS FOR PRODUCING THE SAME

TECHNICAL FIELD

The present invention relates to a porous membrane used as a micro-filtration membrane for water treatment, more particularly to a hollow fiber-form porous water filtration membrane of vinylidene fluoride resin excellent in mechanical strength and also excellent in chemical resistance, and a process for production thereof.

BACKGROUND ART

Vinylidene fluoride resin is excellent in chemical resistance, heat resistance and mechanical strength and, therefore, has been studied with respect to application thereof to porous membranes for separation. In the case of use for water treatment, particular for production of potable water or sewage treatment, a hollow fiber-form porous membrane is frequently used because it can easily provide a large membrane area per unit volume of filtration apparatus.

For the above purpose, a porous membrane is required to show a tensile strength and an elongation at break which are large to some extent so as not to cause fiber severance not only during the filtration operation as a matter of course but also during physical washing, such as back washing or air scrubbing, which is performed to remove clogging of membrane with time.

As the physical washing does not achieve sufficient washing effect against clogging with organic matter, back washing with water containing sodium hypochlorite or ozone or periodical washing with chemicals is also performed. Further, in some case, a filtration operation is performed by adding sodium hypochlorite or ozone to raw water (supply water). Accordingly, a porous membrane is required to have a high chemical resistance so as not to lower its mechanical strength (tensile strength, elongation at break) due to such chemicals for a long period.

As for improvement in mechanical strength and chemical resistance, Patent document 1 listed below contains descriptions to the effect that a porous membrane comprising vinylidene fluoride homopolymer becomes a fragile membrane and that a copolymer shows insufficient mechanical strength unless the content of vinylidene fluoride monomer is substantially lowered, but this results in inferior chemical resistance.

Patent document 2 below describes that a porous membrane having excellent resistance against oxidation with ozone is a membrane showing a maximum peak temperature (of melting point) of at least 160° C. and a higher maximum peak temperature leads to a better ozone resistance. The document also describes that a porous membrane comprising a PVDF resin having a weight-average molecular weight of less than $10^5$ exhibits an extremely low tensile elongation at break.

From these patent documents, it is suggested that (1) a higher crystallinity results in a better chemical resistance and (2) a high-molecular weight polymer results in improved mechanical strength.

The research group of the present inventors has proposed a process of melt-extruding a high molecular weight vinylidene fluoride resin having an inherent viscosity of 1.3-15 dl/g (corresponding to Mw (weight-average molecular weight) of $3.8 \times 10^5$-$51 \times 10^5$) together with a plasticizer and preferably also with a good solvent, cooling the extruded film with a chill roll at a temperature of at most 150° C. from one side and with air from the other side to form a film, and extracting the plasticizer (Patent document 3 below). However, a porous membrane of a sufficiently high crystallinity has not been attained because of a tendency that a higher molecular weight results in a lower crystallinity due to a lower mobility of molecular chain at the time of crystallization.

Accordingly, it is a present state that a porous membrane of vinylidene fluoride resin excellent in both mechanical strength and chemical resistance has not been obtained.

Patent document 1: JP-A 11-152366
Patent document 2: JP-A 2000-218267
Patent document 3: JP-A 7-173323

DISCLOSURE OF INVENTION

A principal object of the present invention is to provide a hollow fiber-form porous water filtration membrane of vinylidene fluoride resin excellent in both mechanical strength and chemical resistance by using a high-molecular weight vinylidene fluoride resin while increasing the crystallinity thereof as high as possible, and also a process for production thereof.

As a result of the present inventors' study with the above-mentioned object, it has been found possible to accomplish an increase in crystallinity even by using a vinylidene fluoride resin of a high molecular weight which is essential for providing the resultant hollow fiber-form porous water filtration membrane with an increased mechanical strength if a hollow fiber film is subjected to cooling under an appropriate condition providing the high-molecular weight vinylidene fluoride resin with an improved mobility of molecular, thereby providing a hollow fiber-form porous water filtration membrane of vinylidene fluoride resin satisfying both excellent mechanical strength and chemical resistance, whereby the present invention is arrived at.

Thus, the hollow fiber-form porous water filtration membrane of vinylidene fluoride resin is characterized by comprising a vinylidene fluoride resin with a weight-average molecular weight of at least $3 \times 10^5$ and having a high crystallinity as represented:by a crystal melting enthalpy of at least 58 J/g measured according to DSC (differential scanning calorimetry).

According to the present invention, there is further provided a process for producing a hollow fiber-form porous water filtration membrane of vinylidene fluoride resin, comprising: adding to 100 wt. parts of a vinylidene fluoride resin having a weight-average molecular weight of at least $3 \times 10^5$ a plasticizer and a good solvent for vinylidene fluoride resin in a total amount of 100-300 wt. parts wherein the good solvent for vinylidene fluoride resin occupies 8-22 wt. % of the total amount (100 wt. %) of the plasticizer and the good solvent for vinylidene fluoride resin to form a composition; melt-extruding the composition into a hollow fiber film; cooling the hollow fiber film with a liquid which is inert to vinylidene fluoride resin from an outer surface side of the hollow fiber film to form a solid hollow fiber film; and removing the plasticizer and the good solvent from the hollow fiber film by extraction.

The reason why the crystallinity of vinylidene fluoride resin in the product hollow fiber-form porous membrane has been increased even though a high-molecular weight vinylidene fluoride resin is used in the process for producing a hollow fiber-form porous water filtration membrane of vinylidene fluoride resin according the present invention, may be considered as follows. In the hollow fiber film after the melt-extrusion, the vinylidene fluoride resin is co-present with the good solvent and plasticizer therefor in specific proportions so that a high mobility of polymer molecules of vinylidene fluoride resin required for re-arrangement to provide a high crystallinity is ensured and in this state, the hollow fiber film is cooled with a liquid cooling medium (a cooling liquid) inert to vinylidene fluoride resin from an outer surface side thereof under an appropriately moderate cooling condition which is preferable for crystallization through re-arrangement of polymer molecules.

BEST MODE FOR PRACTICING THE INVENTION

Hereinbelow, the hollow fiber-form porous water filtration membrane of vinylidene fluoride resin of the present invention will be described in order according to the production process of the present invention that is a preferred process for production thereof.

(Vinylidene Fluoride Resin)

In the present invention, a vinylidene fluoride resin having a weight-average molecular weight molecular weight of at least $3\times10^5$ is used as a principal membrane-forming material. Mw is preferably $3\times10^5$-$6\times10^5$. If Mw is below $3\times10^5$, the mechanical strength of the resultant porous membrane becomes small. On the other hand, if Mw exceeds $6\times10^5$, the texture of phase separation between the vinylidene fluoride resin and the plasticizer tends to become excessively fine to result in a porous membrane exhibiting a lower water permeation rate when used as a microfiltration membrane for water.

The vinylidene fluoride resin used in the present invention may be homopolymer of vinylidene fluoride, i.e., polyvinylidene fluoride, or a copolymer of vinylidene fluoride together with a monomer copolymerizable with vinylidene fluoride, or a mixture of these. Examples of the monomer copolymerizable with vinylidene fluoride may include: tetrafluoroethylene, hexafluoropropylene, trifluoroethylene, chlorotrifluoroethylene and vinylidene fluoride, which may be used singly or in two or more species. The vinylidene fluoride resin may preferably comprise at least 70 mol % as the constituent unit. Among these, it is preferred to use homopolymer consisting of 100 mol % of vinylidene fluoride in view of its high mechanical strength and high chemical resistance.

A vinylidene fluoride resin of a relatively high vinylidene fluoride content as described above may preferably be obtained by emulsion polymerization or suspension polymerization, particularly preferably by suspension polymerization.

The vinylidene fluoride resin forming the porous membrane of the present invention is characterized by a good crystallinity as represented by a difference Tm2-Tc of at most 32° C., preferably at most 30° C., between an inherent melting point Tm2 (° C.) and a crystallization temperature Tc (° C.) of the resin as determined by DSC measurement in addition to the above-mentioned relatively large weight-average molecular weight of at least $3\times10^5$.

Herein, the inherent melting point Tm2 (° C.) of resin should be distinguished from a melting point Tm1 (° C.) determined by subjecting a procured sample resin or a resin constituting a porous membrane as it is to a temperature-increase process according to DSC. More specifically, a vinylidene fluoride resin procured generally exhibits a melting point Tm1 (° C.) different from an inherent melting point Tm2 (° C.) of the resin, due to thermal and mechanical history thereof received in the course of its production or heat-forming process, etc. The melting point Tm2 (° C.) of vinylidene fluoride resin defining the present invention defined as a melting point (a peak temperature of heat absorption according to crystal melting) observed in the course of DSC re-heating after once subjecting a procured sample resin to a prescribed temperature-increase and decrease cycle in order to remove the thermal and mechanical history thereof, and details of the measurement method will be described prior to the description of Examples appearing hereinafter.

The condition of Tm2-Tc≦32° C. representing the crystallinity of vinylidene fluoride resin forming the porous membrane of the present invention may possibly be accomplished, e.g., by a lowering in Tm2 according to copolymerization, but in this case, the resultant hollow fiber porous membrane is liable to have a lower chemical resistance in some cases. Accordingly, it is preferred to use a vinylidene fluoride resin mixture formed by blending 70-98 wt. % of a vinylidene fluoride resin having a weight-average molecular weight molecular weight of $2\times10^5$-$6\times10^5$ as a matrix (or principal) resin and 2-30 wt. % of a high-molecular weight vinylidene fluoride resin having an Mw that is at least 1.8 times, preferably at least 2 times, that of the former and at most $1.2\times10^6$, for crystallinity modification. According to such a method, it is possible to significantly increase the crystallization temperature Tc without changing the crystal melting point of the matrix resin alone (represented by Tm2 in a range of preferably 170-180° C.). More specifically, by increasing Tc, it becomes possible to accelerate the solidification of the vinylidene fluoride resin at an inner portion of film where the cooling is retarded compared with the film surface(s) and at an inner portion toward an opposite surface in the case of a preferential cooling from one surface, thereby suppressing the growth of spherulites. Tc is preferably at least 143° C.

If Mw of the high-molecular weight vinylidene fluoride resin is below 1.8 times Mw of the matrix resin, it becomes difficult to sufficiently suppress the growth of spherulites. On the other hand, above $1.2\times10^6$, the dispersion thereof in the matrix resin becomes difficult.

Further, if the addition amount of the high-molecular weight vinylidene fluoride resin is below 2 wt. %, the effect of suppressing spherulite texture formation is liable to be insufficient, and in excess of 30 wt. %, the texture of phase separation between the vinylidene fluoride resin and the plasticizer is liable to become excessively fine, thus lowering the water permeation rate of the resultant membrane.

According to the present invention, a plasticizer and a good solvent for vinylidene fluoride resin are added to the above-mentioned vinylidene fluoride resin to form a starting composition for formation of the membrane.

(Plasticizer)

As the plasticizer, aliphatic polyesters of a dibasic acid and a glycol may generally be used. Examples thereof may include: adipic acid-based polyesters of, e.g., the adipic acid-propylene glycol type, and the adipic acid-1,3-butylene glycol type; sebacic acid-based polyesters of, e.g., the sebacic acid-propylene glycol type; and azelaic acid-based polyesters of, e.g., the azelaic acid-propylene glycol type, and azelaic acid-1, 3-butylene glycol type.

(Good Solvent)

As the good solvent for vinylidene fluoride resin, those capable of dissolving vinylidene fluoride resin in a temperature range of 20-250° C. may be used. Examples thereof may include: N-methylpyrrolidone, dimethylformamide, dimethylacetamide, dimethyl sulfoxide, methyl ethyl ketone, acetone, tetrahydrofuran, dioxane, ethyl acetate, propylene carbonate, cyclohexane, methyl isobutyl ketone, dimethyl phthalate, and solvent mixtures of these. N-methylpyrrolidone (NMP) is particularly preferred in view of its stability at high temperatures.

(Composition)

The starting composition for formation of the membrane may preferably be obtained by mixing 100 wt. parts of the vinylidene fluoride resin with the above-mentioned plasticizer and good solvent for vinylidene fluoride resin in a total amount of 100-300 wt. parts wherein the good solvent occupies 8-22 wt. % of the total amount (100 wt. %) of the plasticizer and their good solvent.

If the plasticizer is too small in amount, the porosity is lowered to result in a hollow fiber-form water filtration membrane having a lower water permeation rate. On the other hand, if the plasticizer is excessive, the porosity becomes excessively large to result in a lower mechanical strength.

If the good solvent is too small in amount, there is encountered a difficulty, such as failure in uniform mixing of the vinylidene fluoride resin and the plasticizer or necessity of a long time for the mixing. On the other hand, if the good solvent is excessive, it becomes impossible to attain a porosity commensurate with the addition amount of the plasticizer. Thus, the effective formation of pores by extraction of the plasticizer is obstructed.

The plasticizer and the good solvent both have a function of lowering the viscosity of the melt-extrusion composition, and they function interchangeably with each other to some extent.

(Mixing and Melt-Extrusion)

The melt-extrusion composition may be extruded into a hollow fiber film by extrusion through an annular nozzle at a temperature of 140-270° C., preferably 150-200° C. Accordingly, the manners of mixing and melting of the vinylidene fluoride resin, plasticizer and good solvent are arbitrary as far as a uniform mixture in the above-mentioned temperature range can be obtained consequently. According to a preferred embodiment for obtaining such a composition, a twin-screw kneading extruder is used, and the vinylidene fluoride resin (preferably in a mixture of a principal resin and a crystallinity-modifier resin) is supplied from an upstream side of the extruder and a mixture of the plasticizer and the good solvent is supplied at a downstream position to be formed into a uniform mixture until they pass through the extruder and are discharged. The twin-screw extruder may be provided with a plurality of blocks capable of independent temperature control along its longitudinal axis so as to allow appropriate temperature control at respective positions depending on the contents of the materials passing therethrough.

(Cooling)

According to the process of the present invention, the melt-extruded hollow fiber film is cooled from an outside thereof and solidified with a liquid (cooling liquid) which is inert to vinylidene fluoride resin. As the cooling liquid, it is possible to use an arbitrary liquid which is inert to (i.e., non-reactive with and non-solvent for) vinylidene fluoride resin, but it is preferred to use water. The cooling is performed by passing the extruded hollow fiber film through a cooling liquid bath. The temperature of the cooling liquid can be selected from a broad temperature range of 5-120° C., but may preferably be in a range of 10-100° C., particularly preferably 30-80° C.

(Extraction)

The cooled and solidified hollow fiber film is then introduced into an extraction liquid bath to remove the plasticizer and the good solvent therefrom, thereby forming a hollow fiber membrane. The extraction liquid is not particularly restricted provided that it does not dissolve the vinylidene fluoride resin while dissolving the plasticizer and the good solvent. Suitable examples thereof may include: polar solvents having a boiling point on the order of 30-100° C., inclusive of alcohols, such as methanol and isopropyl alcohol, and chlorinated hydrocarbons, such as dichloromethane and 1,1,1-trichloroethane.

The hollow fiber-form membrane after the extraction is a most basic embodiment of the hollow fiber-form porous water filtration membrane of vinylidene fluoride resin improved in mechanical strength and chemical resistance.

(Heat Treatment)

The hollow fiber membrane after the extraction may preferably be heat-treated at a temperature in the range of 80-160° C., preferably 100-140° C., for 1 sec.-3600 sec., preferably 3 sec.-900 sec., to increase the degree of crystallization. The increased crystallinity due to heat-treatment is also preferred for improving the adaptability to stretching, which is preferably adopted as a subsequent operation.

(Stretching)

Thus, the hollow fiber membrane after the extraction is then preferably subjected to stretching, so as to increase the porosity and pore size and improve the strength-elongation characteristic. It is generally preferred to effect a uniaxial stretching in the longitudinal direction of the film or membrane by means of, e.g., a pair of rollers having different circumferential speeds. This is because it has been found that a microscopic texture including a stretched fibril portion and a non-stretched node portion appearing alternately in the stretched direction is preferred for the porous hollow fiber membrane of vinylidene fluoride resin of the present invention to exhibit a harmony of porosity and strength-elongation characteristic thereof. The stretching ratio may appropriately be 1.2-4.0 times, particularly ca. 1.4-3.0 times.

(Elution Liquid Treatment)

It is further preferred to subject the hollow fiber porous membrane after the stretching to a treatment of immersion in an elution liquid. This is because, owing to the elution liquid treatment, the hollow fiber porous membrane of the present invention can be provided with a remarkably increased water permeability without essentially impairing the characteristic properties thereof. As the elution liquid, an alkaline liquid, an acidic liquid or an extraction liquid for the plasticizer is used.

The reason why the water permeability of the porous membrane is remarkably increased by the elution liquid treatment has not been fully clarified as yet, but it is presumed that the plasticizer is exposed at the minute pore wall enlarged in diameter by the stretching and is effectively removed by the elution liquid treatment. The alkaline or acidic liquid as the elution liquid is considered to decompose and solubilize the polyester used as the plasticizer for the vinylidene fluoride resin, thereby promoting the elution and removal thereof.

Accordingly, as the alkaline liquid, it is preferred to use an aqueous solution or a solution in water/alcohol of a strong base, such as sodium hydroxide, potassium hydroxide or calcium hydroxide, at a pH of at least 12, preferably 13 or higher. On the other hand, as the acidic liquid, it is preferred to use an aqueous solution or a solution in water/alcohol of a strong acid, such as hydrochloric acid, sulfuric acid or phosphoric acid at a pH of at most 4, preferably 3 or lower, particularly preferably 2 or lower.

Further, as the extraction liquid for the plasticizer, those dissolving the plasticizer without dissolving the vinylidene fluoride resin can be used without particular restriction similarly as the one used before the stretching. For example, polar solvents having a boiling point of ca. 30-100° C. are suitably used, inclusive of alcohols, such as methanol and isopropyl alcohol, and chlorinated hydrocarbons, such as dichloromethane, and 1,1,1-trichloromethane.

The elution liquid treatment may be effected by immersing the hollow fiber membrane in the elution liquid at a temperature of ca. 5-100° C. for 10 sec. to 6 hours, after an optional pre-immersion for improving the affinity to the liquid. In case where the elution liquid treatment is performed at an elevated temperature, it is preferred to fix the hollow fiber membrane so as not to cause the shrinkage thereof during the treatment.

(Hollow Fiber Porous Membrane of Vinylidene Fluoride Resin)

The hollow fiber porous membrane of vinylidene fluoride resin of the present invention obtained as described above is characterized by a high crystallinity as represented by a crystal melting enthalpy of at least 58 J/g measured by DSC. The crystal melting enthalpy is preferably 60 J/g or higher. As a result thereof, it becomes possible to attain a high chemical resistance represented by a tensile strength-retention ratio of at least 90% and a tensile break elongation-retention ratio of at least 90% after immersion in a sodium hypochlorite aqueous solution, which will be discussed hereinafter, as a practical characteristic.

Further, the hollow fiber porous membrane of the present invention obtained through a stretching step according to a preferred embodiment, may be generally provided with properties, inclusive of: a porosity of 55-90%, preferably 60-85%, particularly preferably 65-80%; a tensile strength of at least 5 MPa, an elongation at break of at least 5%, and when used as a water-filtering membrane, a water permeation rate of at least 5 $m^3/m^2$·day at 100 kPa. The thickness is ordinarily in the range of 5-800 μm, preferably 50-600 μm, particularly preferably 150-500 μm. The outer diameter of the hollow fiber may suitably be on the order of 0.3-3 mm, particularly ca. 1-3 mm.

Further, a micro-texture characteristic of the porous membrane of vinylidene fluoride resin according to the present invention obtained through the stretching is that it comprises a crystalline oriented portion and a crystalline non-oriented portion (random oriented portion) recognizable by X-ray diffraction, which are understood as corresponding to a stretched fibril portion and a non-stretched node portion, respectively.

(X-Ray Diffraction Method)

More specifically, the X-ray diffraction characteristics of hollow fiber membrane materials described herein are based on measured results according to the following method.

A hollow fiber membrane was split into halves along a longitudinal direction thereof, and a membrane sample was attached to a sample stand so that its longitudinal direction was oriented vertically. Then, X-rays were incident in a direction perpendicular to the longitudinal direction. The X-ray generator was "ROTAFLEX 200RB" made by Rigaku Denki K.K., and CuKα rays at 30 kV-100 mA and having passed through an Ni filter were used as an X-ray source. An imaging plate ("BAS-SR127" made by Fuji Shashin Film K.K.) was used to photograph a diffraction image at a sample-imaging plate distance of 60 mm.

As a result, the presence in mixture of the crystal oriented portion and the crystal non-oriented portion in the hollow fiber porous membrane of the present invention can be quantitatively represented by X-ray diffraction parameters including a diffraction intensity ratio on the meridian of at least 1.1 between those at diffraction angles $2\theta=20.1\pm1°$ and $2\theta=23.0\pm1°$, and an azimuth intensity distribution curve at $2\theta=20.1\pm1°$ showing a peak having a half-value width of at most 80°.

EXAMPLES

Hereinbelow, the present invention will be described more specifically based on Examples and Comparative Examples. The properties other than the above-mentioned X-ray diffraction characteristics described herein including those described below are based on measured values according to the following methods.

(Weight-Average Molecular Weight Molecular Weight)

A GPC apparatus ("GPC-900", made by Nippon Bunko K.K.) was used together with a column of "Shodex KD-806M and a pre-column of "Shodex KD-G"(respectively made by Showa Denko K.K.), and measurement according to GPC (gel permeation chromatography) was performed by using NMP as the solvent at a flow rate of 10 ml/min. at a temperature of 40° C. to measure polystyrene-based molecular weights.

(Crystalline Melting Points Tm1, Tm2, Crystal Melting Enthalpy and Crystallization Temperature Tc)

A differential scanning calorimeter "DSC-7" (made by Perkin-Elmer Corp.) was used. A sample resin of 10 mg was set in a measurement cell, and in a nitrogen gas atmosphere, once heated from 30° C. up to 250° C. at a temperature-raising rate of 10° C./min., then held at 250° C. for 1 min. and cooled from 250° C. down to 30° C. at a temperature-lowering rate of 10° C./min., thereby to obtain a DSC curve. On the DSC curve, an endothermic peak temperature in the course of heating was determined as a melting point Tm1 (° C.), and a heat of absorption by the endothermic peak giving Tm1 was measured as a crystal melting enthalpy. Further, an exothermic peak temperature in the course of cooling was determined as a crystallization temperature Tc (° C.). Successively thereafter, the sample resin was held at 30° C. for 1 min., and re-heated from 30° C. up to 250° C. at a temperature-raising rate of 10° C./min. to obtain a DSC curve. An endothermic peak temperature on the re-heating DSC curve was determined as an inherent melting point Tm2 (° C.) defining the crystallinity of vinylidene fluoride resin in the present invention.

(Porosity)

The length and also the outer diameter and inner diameter of a sample hollow fiber porous membrane were measured to calculate an apparent volume V ($cm^3$) of the porous membrane, and the weight W (g) of the porous membrane was measured to calculate a porosity according to the following formula:

Porosity (%)=$(1-W/(V\times\rho))\times100$, wherein ρ: density of PVDF (=1.78 $g/cm^3$)

(Water Permeation Rate (Flux))

A sample hollow fiber porous membrane was immersed in ethanol for 15 min., then immersed in water to be hydrophilized, and then subjected to a measurement at a water temperature of 25° C. and a pressure difference of 100 kPa. The test length (i.e., length of a portion used for filtration) of hollow fiber porous membrane was set to 800 mm, and the area of the membrane was calculated based on the outer diameter according to the following formula:

Membrane area ($m^2$)=(outer diameter)$\times\pi\times$(test length).

(Average Pore Diameter)

An average pore diameter was measured according to the half dry method based on ASTM F316-86 and ASTM E1294-89 by using "PERMPOROMETER CFP-2000AEX" made by Porous Materials, Inc. A perfluoropolyester (trade name "Galwick") was used as the test liquid.

(Maximum Pore Diameter)

A maximum pore diameter was measured according to the bubble point method based on ASTM F316-86 and ASTM E1294-89 by using "PERMPOROMETER CFP-2000AEX" made by Porous Materials, Inc. A perfluoropolyester (trade name "Galwick") was used as the test liquid.

(Tensile Strength and Elongation at Break)

Measured by using a tensile tester ("RTM-100", made by Toyo Baldwin K.K.) under the conditions of an initial sample length of 100 mm and a crosshead speed of 200 mm/min. in an environment of a temperature of 23° C. and a relative humidity of 50%.

A hollow fiber membrane sample was immersed in ethanol for 15 min. and then immersed in pure water to be hydrophilized. Thereafter, the sample was immersed for 4 weeks in a 5 wt. % sodium hypochlorite aqueous solution maintained at 50° C., then washed and dried to be subjected to measurement of a tensile strength and an elongation at break under the same conditions as mentioned in the former section. A tensile strength-retention ratio (%) and a break elongation-retention ratio (%) were calculated according to the following formulae:

Tensile strength-retention ratio (%)=[Tensile strength after immersion (MPa)/Tensile strength before immersion (MPa)]×100

Break elongation-retention ratio (%)=[Elongation at break after immersion (%)/Elongation at break before immersion(%)]×10

Example 1

A polyvinylidene fluoride (PVDF) (powder) having a weight-average molecular weight molecular weight of $4.92 \times 10^5$ was used as a starting vinylidene fluoride resin.

An adipic acid-based polyester plasticizer ("PN-150", made by Asahi Denka Kogyo K.K.) as an aliphatic polyester and N-methyl-pyrrolidone (NMP) as a solvent were mixed under stirring in a ratio of 87.5 wt. %/12.5 wt. % at room temperature to obtain a mixture B.

An equi-directional rotation and engagement-type twin-screw extruder ("BT-30", made by Plastic Kogaku Kenkyusyo K.K.; screw diameter: 30 mm, L/D=48) was used, and the above-mentioned starting vinylidene fluoride resin (PVDF) was supplied from a powder supply port at a position of 80 mm from the upstream end of the cylinder and the mixture B heated to 100° C. was supplied from a liquid supply port at a position of 480 mm from the upstream end of the cylinder at a ratio of PVDF/mixture B=42.9/57.1 (wt. %), followed by kneading at a barrel temperature of 210° C. to extrude the melt-kneaded product through a nozzle having an annular slit of 7 mm in outer diameter and 3.5 mm in inner diameter into a hollow fiber-form extrudate at a rate of 13 g/min.

The extruded mixture in a molten state was introduced into a water bath maintained at 11° C. and having a surface 140 mm distant from the nozzle (i.e., an air gap of 140 mm) to be cooled and solidified (at a residence time in water bath of ca. 5 sec.), pulled up at a take-up speed of 5 m/min. and wound up to obtain a first intermediate form.

Then, the first intermediate form was fixed so as not to shrink in the longitudinal direction and, while being kept in the fixed state, was immersed under vibration in dichloromethane at room temperature for 30 min, followed by immersion in fresh dichloromethane again under the same conditions to extract the aliphatic polyester and solvent and further by 1 hour of heating in an oven at 120° C., while being continually fixed, for removal of the dichloromethane and heat treatment, thereby to obtain a second intermediate form.

Then, the second intermediate form was longitudinally stretched at a ratio of 2.0 times at an environmental temperature of 25° C. and then heated for 1 hour in an oven at a temperature of 100° C. for heat setting to obtain a polyvinylidene fluoride-based porous hollow fiber.

The production conditions and the physical properties of the resultant polyvinylidene fluoride-based porous hollow membrane are inclusively shown in Table 1 appearing hereinafter together with those of Examples and Comparative Examples described below.

Example 2

A porous follow fiber was prepared in the same manner as in Example 1 except that the air gap was changed to 300 mm, the take-up speed of the melt-extruded product after cooling and solidification was changed to 5 m/min, and the take-up stretching ratio was changed to 1.3 times.

Example 3

A principal polyvinylidene fluoride (PVDF) (powder) having a weight-average molecular weight molecular weight of $2.52 \times 10^5$ and a crystallinity-modifier polyvinylidene fluoride (PVDF) (powder) having $Mw=6.59 \times 10^5$ were blended in proportions of 87.5 wt. % and 12.5 wt. %, respectively, by a Henschel mixer to obtain a mixture A having $Mw=3.03 \times 10^5$.

An adipic acid-based polyester plasticizer ("PN-150", made by Asahi Denka Kogyo K.K.) as an aliphatic polyester and N-methyl-pyrrolidone (NMP) as a solvent were mixed under stirring in a ratio of 87.5 wt. %/12.5 wt. % at room temperature to obtain a mixture B.

An equi-directional rotation and engagement-type twin-screw extruder ("BT-30", made by Plastic Kogaku Kenkyusyo K.K.; screw diameter: 30 mm, L/D=48) was used, and the mixture A was supplied from a powder supply port at a position of 80 mm from the upstream end of the cylinder and the mixture B heated to 100° C. was supplied from a liquid supply port at a position of 480 mm from the upstream end of the cylinder at a ratio of mixture A/mixture B=37.5/62.5 (wt. %), followed by kneading at a barrel temperature of 210° C. to extrude the melt-kneaded product through a nozzle having an annular slit of 7 mm in outer diameter and 3.5 mm in inner diameter into a hollow fiber-form extrudate at a rate of 13 g/min.

The extruded mixture in a molten state was introduced into a water bath maintained at 60° C. and having a surface 10 mm distant from the nozzle (i.e., an air gap of 10 mm) to be cooled and solidified (at a residence time in water bath of ca. 10 sec.), pulled up at a take-up speed of 5 m/min. and wound up to obtain a first intermediate form.

Then, the first intermediate form was fixed so as not to shrink in the longitudinal direction and, while being kept in the fixed state, was immersed under vibration in dichloromethane at room temperature for 30 min, followed by immersion in fresh dichloromethane again under the same conditions to extract the aliphatic polyester and solvent and further by 1 hour of heating in an oven at 120° C., while being continually fixed, for removal of the dichloromethane and heat treatment, thereby to obtain a second intermediate form.

Then, the second intermediate form was longitudinally stretched at a ratio of 1.6 times at an environmental temperature of 25° C. and then heated for 1 hour in an oven at a temperature of 100° C. for heat setting to obtain a polyvinylidene fluoride-based porous hollow fiber.

Example 4

The porous hollow fiber obtained in Example 3 was fixed so as not shrink in the longitudinal direction and, while being kept in this state, was immersed in ethanol for 15 min. and then in pure water for 15 min. to be hydrophilized, followed by immersion in 20%-caustic soda aqueous solution (pH 14) maintained at 70° C. for 1 hour, washing with water and 1 hour of drying in a warm air oven maintained at 60° C.

Example 5

A porous hollow fiber was obtained in the same manner as in Example 3 except for changing the temperature of the cooling water bath for cooling the melt-extruded mixture to 11° C. and the stretching ratio to 1.8 times.

Example 6

A porous hollow fiber was obtained in the same manner as in Example 5 except for using a mixture A obtained by changing the mixing ratio of the principal PVDF and the modifier PVDC to 50/50 (wt. %) and increasing the air gap to 140 mm.

Example 7

A principal polyvinylidene fluoride (PVDF) (powder) having a weight-average molecular weight molecular weight of $2.52 \times 10^5$ and a crystallinity-modifier polyvinylidene fluoride (PVDF) (powder) having Mw=$6.91 \times 10^5$ were blended in proportions of 75 wt. % and 25 wt. %, respectively, by a Henschel mixer to obtain a mixture A having Mw=$3.67 \times 10^5$.

An adipic acid-based polyester plasticizer ("PN-150", made by Asahi Denka Kogyo K.K.) as an aliphatic polyester and N-methyl-pyrrolidone (NMP) as a solvent were mixed under stirring in a ratio of 87.5 wt. %/12.5 wt. % at room temperature to obtain a mixture B.

An equi-directional rotation and engagement-type twin-screw extruder ("BT-30", made by Plastic Kogaku Kenkyusyo K.K.; screw diameter: 30 mm, L/D=48) was used, and the mixture A was supplied from a powder supply port at a position of 80 mm from the upstream end of the cylinder and the mixture B heated to 100° C. was supplied from a liquid supply port at a position of 480 mm from the upstream end of the cylinder at a ratio of mixture A/mixture B=40/60 (wt. %), followed by kneading at a barrel temperature of 220° C. to extrude the melt-kneaded product through a nozzle having an annular slit of 7 mm in outer diameter and 5 mm in inner diameter into a hollow fiber-form extrudate at a rate of 9.8 g/min. In this instance, air was injected into a hollow part of the fiber at a rate of 6.2 ml/min. through an air supply port provided at a center of the nozzle.

The extruded mixture in a molten state was introduced into a water bath maintained at 60° C. and having a surface 30 mm distant from the nozzle (i.e., an air gap of 30 mm) to be cooled and solidified (at a residence time in water bath of ca. 10 sec.), pulled up at a take-up speed of 5 m/min. and wound up to obtain a first intermediate form. The first intermediate form had an inner diameter of 1.462 mm and an outer diameter of 2.051 mm.

Then, the first intermediate form was fixed so as not to shrink in the longitudinal direction and, while being kept in the fixed state, was immersed under vibration in dichloromethane ($CH_2Cl_2$) at room temperature for 30 min, followed by immersion in fresh dichloromethane again under the same conditions to extract the aliphatic polyester and solvent and further by 1 hour of heating in an oven at 120° C., while being continually fixed, for removal of the dichloromethane and heat treatment, thereby to obtain a second intermediate form.

Then, the second intermediate form was longitudinally stretched at a ratio of 1.8 times at an environmental temperature of 25° C. and then, while being kept fixed so as not to shrink in the longitudinal direction, was immersed under vibration in dichloromethane at room temperature for 30 min., followed by immersion in fresh dichloromethane under the same conditions and further by 1 hour of heating in an oven at a temperature of 150° C. for removal of dichloromethane and heat setting to obtain a polyvinylidene fluoride-based porous hollow fiber.

Example 8

A porous hollow fiber was obtained in the same manner as in Example 7 except for using a mixture A obtained by changing the principal PVDF to a PVDF (powder) of Mw=$4.12 \times 10^5$, the modifier PVDF to a PVDF (powder) of Mw=$9.36 \times 10^5$ and the mixing ratio of the principal PVDF and the modifier PVDF to 95/5 (wt. %), using a mixture B obtained by changing the mixing ratio of the plasticizer and the good solvent to 82.5/17.5 (wt. %), and changing the supply ratio of the mixture A and the mixture B to 35.7/64.3 (wt. %), the air gap to 150 mm and the stretching ratio to 1.7 times.

Example 9

A porous hollow fiber was obtained in the same manner as in Example 8 except for changing the nozzle outer diameter to 5 mm, the nozzle inner diameter to 3.5 mm and the air gap to 170 mm.

Example 10

A porous hollow fiber of vinylidene fluoride resin was prepared in the same manner as in Example 9 except for omitting the stretching and the elution liquid treatment.

Comparative Example 1

A porous membrane of vinylidene fluoride resin was prepared according to a method as described in Example 3 of JP-A 7-173323. More specifically, 100 wt. parts of PVDF having a weight-average molecular weight of $4.40 \times 10^5$ (inherent viscosity of 1.6 dl/g) was blended with 117 wt. parts of an adipic acid-based polyester plasticizer ("PN-150") and 17 wt. parts of N-methylpyrrolidone at room temperature and then melt-extruded at 200° C. to be pelletized. The resultant pellets were melt-extruded at 180° C. though a melt-extruder equipped with a T-die having a width of 350 mm and a lip clearance of 1.4 mm into a 500 μm-thick film, and one surface of the film was cooled by a chill roll at a temperature of 60° C. while the opposite surface being cooled by means of an air knife to form a continuous film. The film was immersed for 10 minutes in methylene chloride at room temperature while being subjected to vibration to extract the plasticizer. The film was then held in a state of preventing shrinkage and heat-treated in a dry state for 30 minutes to obtain a porous membrane of vinylidene fluoride resin.

The above-obtained porous membrane of vinylidene fluoride resin according to Example 3 of JP-A 7-173323 was stretched at a ratio of 2.5 times in a longitudinal direction at an environmental temperature of 25° C. and then heated for 1 hour in an oven at 100° C. for thermal fixation to obtain a porous membrane of vinylidene fluoride resin.

Comparative Examples 2 and 3

Commercially available porous membrane hollow fibers of vinylidene fluoride resin ("MICROZA USV-3003", made by Asahi Kasei K.K.; and "TREFILM HFM1010-X" made by Toray K.K.) were respectively subjected to measurement of physical properties.

The compositions, production conditions (limited to those known to the inventors) and physical properties of the porous membranes of vinylidene fluoride resin obtained according to Examples and Comparative Examples are inclusively shown in Table 1 below.

TABLE 1

| | | | Example 1 | Example 2 | Example 3 | Example 4 | Example 5 | Example 6 | Example 7 |
|---|---|---|---|---|---|---|---|---|---|
| Starting material composition | Mixture A | Principal PVDF's Mw ($\times 10^5$) | 4.92 | 6.59 | 2.52 | 2.52 | 2.52 | 2.52 | 2.52 |
| | | Modifier PVDF's Mw ($\times 10^5$) | none | none | 6.59 | 6.59 | 6.59 | 6.59 | 6.91 |
| | | PVDF mixing ratio (wt. %) | 100/0 | 100/0 | 87.5/12.5 | 87.5/12.5 | 87.5/12.5 | 50/50 | 75/25 |
| | | Mixture's Mw ($\times 10^5$) | 4.92 | 6.59 | 3.03 | 3.03 | 3.03 | 4.56 | 3.67 |
| | Mixture B | Polyester plasticizer | PN-150 | PN-150 | PN-150 | PN-150 | PN-150 | PN-150 | PN-150 |
| | | Solvent | NMP | NMP | NMP | NMP | NMP | NMP | NMP |
| | | Plasticizer/solvent mixing ratio (wt. %) | 87.5/12.5 | 87.5/12.5 | 87.5/12.5 | 87.5/12.5 | 87.5/12.5 | 82.5/17.5 | 82.5/17.5 |
| | | Mixture A/Mixture B Supply ratio (wt. %) | 42.9/57.1 | 33.3/66.7 | 37.5/62.5 | 37.5/62.5 | 37.5/62.5 | 37.5/62.5 | 40/60 |
| Production conditions | | Air gap (mm) | 140 | 300 | 10 | 10 | 10 | 140 | 30 |
| | | Water bath temp. (° C.) | 11 | 11 | 60 | 60 | 11 | 11 | 60 |
| | | Take-up speed (m/min) | 10 | 5 | 5 | 5 | 5 | 5 | 5 |
| | | Stretch ratio | 2 | 1.3 | 1.6 | 1.6 | 1.8 | 1.8 | 1.8 |
| | | Elution liquid treatment | none | none | none | alkali | none | none | CH2Cl2 |
| Physical properties | | Outer diameter (mm) | 0.90 | 1.66 | 1.49 | 1.56 | 1.55 | 1.62 | 1.63 |
| | | Inner diameter (mm) | 0.41 | 0.77 | 0.70 | 0.72 | 0.74 | 0.54 | 1.13 |
| | | Thickness (mm) | 0.25 | 0.44 | 0.39 | 0.42 | 0.41 | 0.54 | 0.25 |
| | | Porosity (%) | 60 | 60 | 72 | 74 | 77 | 72 | 75 |
| | | Water permeation rate ($m^3/m^2 \cdot day \cdot 100$ kPa) | 1.1 | 1.8 | 18.0 | 36.6 | 13.5 | 5.3 | 36.8 |
| | | Ave. pore diameter (μm) | — | — | 0.086 | 0.096 | 0.072 | 0.065 | 0.129 |
| | | Max. pore diameter (μm) | — | — | 0.184 | 0.184 | 0.145 | 0.145 | 0.275 |
| | | Tensile strength (MPa) | 37.1 | 5.8 | 9.1 | 7.1 | 8.9 | 13.9 | 17.4 |
| | | Elongation at break (%) | 44 | 12 | 7 | 6 | 8.7 | 77 | 40 |
| | DSC | Tm1 (° C.) | 174.6 | 174.5 | 175.4 | 175.4 | 175.2 | 174.9 | 174.6 |
| | | Tm1 Melting enthalpy (J/g) | 58.3 | 58.8 | 60.1 | 60.1 | 62.5 | 59.1 | 59.4 |
| | | Tc (° C.) | 139.0 | 140.9 | 144.0 | 144.0 | 144.1 | 146.3 | 146.1 |
| | | Tm2 (° C.) | 173.2 | 172.7 | 174.9 | 174.9 | 175.1 | 174.8 | 174.9 |
| | | Tm2 − Tc (° C.) | 34.2 | 31.8 | 30.8 | 30.8 | 31 | 28.5 | 28.8 |
| | Chemical resistance | Tensil strength retention (%) | 90.0 | 91.0 | 93.9 | 94.0 | 96.1 | 92.1 | 93.0 |
| | | Break elongation retention (%) | 105.1 | 104.0 | 114.6 | 110.0 | 119.0 | 111.2 | 113.3 |

| | | | Example 8 | Example 9 | Example 10 | Comp. 1 | Comp. 2 | Comp. 3 |
|---|---|---|---|---|---|---|---|---|
| Starting material composition | Mixture A | Principal PVDF's Mw ($\times 10^5$) | 4.12 | 4.12 | 4.12 | 4.40 | | |
| | | Modifier PVDF's Mw ($\times 10^5$) | 9.36 | 9.36 | 9.36 | none | | |
| | | PVDF mixing ratio (wt. %) | 95/5 | 95/5 | 95/5 | 100/0 | | |
| | | Mixture's Mw ($\times 10^5$) | 4.38 | 4.38 | 4.38 | 4.40 | | |
| | Mixture B | Polyester plasticizer | PN-150 | PN-150 | PN-150 | PN-150 | | |
| | | Solvent | NMP | NMP | NMP | NMP | | |
| | | Plasticizer/solvent mixing ratio (wt. %) | 82.5/17.5 | 82.5/17.5 | 82.5/17.5 | 87.5/12.5 | | |
| | | Mixture A/Mixture B Supply ratio (wt. %) | 35.7/64.3 | 35.7/64.3 | 35.7/64.3 | 42.9/57.1 | | |
| Production conditions | | Air gap (mm) | 150 | 170 | 170 | 60 | | |
| | | Water bath temp. (° C.) | 60 | 60 | 60 | 60* | | |
| | | Take-up speed (m/min) | 5 | 5 | 5 | 5 | | |
| | | Stretch ratio | 1.7 | 1.7 | none | 2.5 | | |
| | | Elution liquid treatment | CH2Cl2 | CH2Cl2 | none | none | | |
| Physical properties | | Outer diameter (mm) | 1.57 | 1.57 | 1.73 | | 1.26 | 1.39 |
| | | Inner diameter (mm) | 1.07 | 1.07 | 1.18 | | 0.68 | 0.89 |
| | | Thickness (mm) | 0.25 | 0.25 | 0.28 | 0.05 | 0.29 | 0.25 |
| | | Porosity (%) | 76 | 76 | 54 | 68 | 65 | 57 |
| | | Water permeation rate ($m^3/m^2 \cdot day \cdot 100$ kPa) | 66.6 | 71.5 | 8.9 | 10.2 | 22.4 | 21.5 |
| | | Ave. pore diameter (μm) | 0.130 | 0.131 | — | 0.200 | 0.085 | 0.096 |
| | | Max. pore diameter (μm) | 0.278 | 0.277 | — | 0.350 | 0.205 | 0.448 |
| | | Tensile strength (MPa) | 11.4 | 10.9 | 11.3 | 4.2 | 7.5 | 11.6 |
| | | Elongation at break (%) | 21 | 18 | 127 | 64 | 192 | 45 |
| | DSC | Tm1 (° C.) | 174.7 | 174.5 | 173.8 | 174.6 | 175.0 | 170.5 |
| | | Tm1 Melting enthalpy (J/g) | 61.8 | 59.3 | 62.5 | 56.2 | 45.1 | 55.4 |
| | | Tc (° C.) | 145.5 | 145.2 | 146.8 | 140.6 | 139.9 | 139.9 |

TABLE 1-continued

|  |  | | | | | | |
|---|---|---|---|---|---|---|---|
|  | Tm2 (° C.) | 174.1 | 174.3 | 173.9 | 173.6 | 173.8 | 172.8 |
|  | Tm2 – Tc (° C.) | 28.6 | 29.1 | 27.1 | 33.0 | 33.9 | 32.9 |
| Chemical | Tensil strength retention (%) | 95.5 | 93.6 | 92 | 82.9 | 77.7 | 80.5 |
| resistane | Break elongation retention (%) | 115.9 | 113.1 | 110.2 | 75.9 | 62.2 | 72.0 |

*Water bath temperature for Comparative Example 1 is actically a chill roll temperature (=60° C.)

INDUSTRIAL APPLICABILITY

As shown in Table 1 above, hollow fiber-form porous membranes of vinylidene fluoride resin obtained by cooling from an outside thereof with a cooling liquid in a state of co-presence with a good solvent exhibited a crystal melting enthalpy larger than 58 J/g and excellent chemical resistance as represented by a tensile strength retention ratio of at least 90% and a break elongation-retention ratio of at least 90% after immersion in a sodium hypochlorite aqueous solution, in contrast with those of Comparative Examples. Accordingly, they are useful as water micro-filtration membranes in combination with their excellent mechanical strength represented by tensile strength and elongation at break.

The invention claimed is:

1. A hollow fiber-form porous water filtration membrane of vinylidene fluoride resin, comprising: a vinylidene fluoride resin with a weight-average molecular weight of at least $3 \times 10^5$ and having a high crystallinity as represented by a crystal melting enthalpy of at least 58 J/g measured according to DSC (differential scanning calorimetry).

2. A porous water filtration membrane according to claim 1, comprising a vinylidene fluoride resin having a weight-average molecular weight of $3 \times 10^5 - 6 \times 10^5$ and exhibiting a difference Tm2–Tc of at most 32° C. between an inherent melting point Tm2 (°C.) and a crystallization temperature Tc (°C.) of the resin according to DSC measurement.

3. A porous water filtration membrane according to claim 1, comprising vinylidene fluoride homopolymer.

4. A process for producing a hollow fiber-form porous water filtration membrane of vinylidene fluoride resin, comprising:

adding to 100 wt. parts of a vinylidene fluoride resin having a weight-average molecular weight of at least $3 \times 10^5$ a plasticizer and a good solvent for vinylidene fluoride resin in a total amount of 100-300 wt. parts wherein the good solvent for vinylidene fluoride resin occupies 8-22 wt. % of the total amount (100 wt. %) of the plasticizer and the good solvent for vinylidene fluoride resin to form a composition;

melt-extruding the composition into a hollow fiber film;

cooling the hollow fiber film with a liquid which is inert to vinylidene fluoride resin from an outer surface side of the hollow fiber film to form a solid hollow fiber film; and removing the plasticizer and the good solvent from the hollow fiber film by extraction.

5. A production process according to claim 4, wherein the inert liquid for cooling is at a temperature of 5-120° C.

6. A production process according to claim 5, including a step of stretching the hollow fiber film of vinylidene fluoride resin after the removal of the plasticizer.

7. A production process according to claim 6, including a step of treating the hollow fiber film after the stretching with an elution liquid.

8. A production process according to claim 7, wherein the elution liquid comprises an alkaline liquid at a pH of at least 12.

9. A production process according to claim 7, wherein the elution liquid comprises an acid liquid at a pH of at most 4.

10. A production process according to claim 7, wherein the elution liquid comprise a liquid for extracting the plasticizer.

11. A porous water filtration membrane according to claim 2, comprising vinylidene fluoride homopolymer.

* * * * *